United States Patent
Honda et al.

(10) Patent No.: US 10,566,013 B1
(45) Date of Patent: Feb. 18, 2020

(54) SEMICONDUCTOR LASER FOR THERMALLY-ASSISTED MAGNETIC RECORDING HEAD

(71) Applicants: SAE Magnetics (H.K.) Ltd., Hong Kong (CN); Headway Technologies, Inc., Milpitas, CA (US)

(72) Inventors: Takashi Honda, Hong Kong (CN); Ryo Hosoi, Hong Kong (CN); Wah Chun Chan, Hong Kong (CN); Makoto Kawato, Hong Kong (CN); Dayu Zhou, Milpitas, CA (US); Koji Shimazawa, Milpitas, CA (US); Kowang Liu, Milpitas, CA (US)

(73) Assignees: SAE MAGNETICS (H.K.) LTD., Hong Kong (CN); HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 16/250,131

(22) Filed: Jan. 17, 2019

(51) Int. Cl.
*G11B 11/105* (2006.01)
*G11B 5/012* (2006.01)
*G11B 5/00* (2006.01)
*G11B 5/31* (2006.01)
*G11B 5/60* (2006.01)

(52) U.S. Cl.
CPC .............. *G11B 5/012* (2013.01); *G11B 5/314* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 6,757,499 B1 * | 6/2004 | Aoki | ................... | H04B 10/504 372/32 |
| 8,134,794 B1 * | 3/2012 | Wang | ................... | G11B 5/314 360/110 |
| 8,451,556 B1 * | 5/2013 | Wang | ................... | G11B 5/314 360/110 |
| 2011/0280512 A1 * | 11/2011 | Abe | ....................... | G02F 1/377 385/14 |

(Continued)

FOREIGN PATENT DOCUMENTS

JP     2000091692 A  *  3/2000

OTHER PUBLICATIONS

Computer translation of JP 2000-091692, Mar. 2000.*

*Primary Examiner* — Tan X Dinh
(74) *Attorney, Agent, or Firm* — Nixon & Vanderhye PC

(57) ABSTRACT

A light source unit for thermally-assisted magnetic head includes a substrate member having a bonding surface, multiple layers formed on the bonding surface and comprising a base layer, a connection pad layer, an insulation layer and a bonding layer; a light source assembly attached on the bonding layer of the substrate member and having a laser diode embedded therein and connected to the connection pad layer on the bonding surface, so as to form a laser diode circuit; and a heater buried in the insulation layer and connected to the connection pad layer, so as to form a heater circuit. The light source unit can maintain stable heat power for facilitating performance of the thermally-assisted magnetic head, and further reduce the sizes of the light source unit and substrate member.

9 Claims, 10 Drawing Sheets

(56) References Cited

U.S. PATENT DOCUMENTS

| | | | | |
|---|---|---|---|---|
| 2011/0317527 A1* | 12/2011 | Wang | ............... | G11B 5/105 |
| | | | | 369/13.02 |
| 2013/0133182 A1* | 5/2013 | Bonhote | ............ | G11B 5/105 |
| | | | | 29/603.03 |
| 2016/0232928 A1* | 8/2016 | Honda | ............ | G01J 1/44 |

* cited by examiner

SEMICONDUCTOR LASER FOR THERMALLY-ASSISTED MAGNETIC RECORDING HEAD

FIELD OF THE INVENTION

The present invention relates to a hard disk drive (HDD) with thermally-assisted magnetic heads and, more particularly, to a stable light source unit for thermally-assisted magnetic heads.

BACKGROUND OF THE INVENTION

HDDs are common information storage devices. With improvements in recording density of magnetic HDDs, there has been a demand for improving the performance of magnetic heads and magnetic recording media. In a magnetic hard disk drive, a magnetic head is embedded in a slider that flies above the surface of a magnetic recording medium.

Recently, a technology so-called thermal assisted magnetic recording (TAMR) has been proposed, and a thermal assisted magnetic head also has been put to use. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization.

Commonly, the heat source comes from the thermal assisted magnetic head. FIG. 1a shows a perspective view of a conventional thermal assisted magnetic head 100. The thermal assisted magnetic head 100 includes a slider body 110 having an air bearing surface (ABS) (not shown, under) processed so as to provide an appropriate flying height and a light source unit 130 mounted on the slider body 110. The slider body 110 includes a bottom surface 112 opposite the ABS, a trailing edge 113 where read and write elements 115 are embedded, and a leading edge (not shown, back) opposite the trailing edge 113. The light source unit 130 is mounted on the position where the write elements are embedded via a bonding layer. The light source unit 130 includes a light source 131 located near the write element and a substrate member 132 for supporting the light source 131. The substrate member 132 is bonded to the slider body 110 by using a solder layer, for example. The light source 131 has a laser diode embedded therein which emits a laser light to a portion of the magnetic recording medium, which reduces the medium's coercivity. After that, writing is performed by applying write magnetic field to the heated portion; therefore the writing operation is facilitated.

As shown in FIG. 1b, since the power of the laser light periodic, thus the power is unstable. When the laser diode is turned off, the temperature is decreased gradually, after a certain time, the laser diode is turned on to make the temperature rise again. By this token, the temperature of the laser diode is unstable, thus the writing operation on the disk track is unstable.

Thus, it is desired to provide an improved light source unit and a thermally-assisted magnetic head to overcome the above-mentioned drawbacks.

SUMMARY OF THE INVENTION

One objective of the present invention is to provide a light source unit, which can maintain stable heat power for facilitating performance of the thermally-assisted magnetic head, further reduce the sizes of the light source unit and substrate member.

Another objective of the present invention is to provide a thermally-assisted magnetic head, which can maintain stable heat power for facilitating performance of the thermally-assisted magnetic head, further reduce the sizes of the light source unit and substrate member.

To achieve above objectives, a light source unit for thermally-assisted magnetic head includes a substrate member having a bonding surface, multiple layers formed on the bonding surface and comprising a base layer, a connection pad layer, an insulation layer and a bonding layer; a light source assembly attached on the bonding layer of the substrate member and having a laser diode embedded therein and connected to the connection pad layer on the bonding surface, so as to form a laser diode circuit; and a heater buried in the insulation layer and connected to the connection pad layer, so as to form a heater circuit.

As a preferable embodiment, the bonding surface of the substrate member has a bonding area that is bonded to the light source assembly, and the heater is buried below the light source assembly and located within the bonding area.

Preferably, the connection pad layer comprises a heater pad connected with the heater and a common grounding pad connected with the heater and the laser diode respectively.

Preferably, a via hole is formed between the insulation layer and the common grounding pad, a first lead is connected between the via hole and the heater, a second lead is connected between the heater and the heater pad, so as to form the heater circuit.

Preferably, a laser diode pad is formed on the light source assembly, and the laser diode is connected with the laser diode pad and the common grounding pad, so as to form the laser diode circuit.

As another preferable embodiment, the connection pad layer comprises a heater pad, a heater grounding pad and a laser diode grounding pad, the heater pad and the heater grounding pad are connected with the heater, the laser diode grounding pad is connected with the laser diode, and a laser diode pad is formed on the light source assembly and connected with the laser diode.

Preferably, the heater pad is formed on the base layer of the substrate member and located beyond the bonding area.

As one more embodiment, the bonding surface of the substrate member has a bonding area that is bonded to the light source assembly, and the heater is buried beside the light source assembly and located beyond the bonding area.

Preferably, the connection pad layer comprises a heater pad, a heater grounding pad and a laser diode grounding pad, the heater pad and heater grounding pad are connected with the heater, the laser diode grounding pad is connected with the laser diode, and a laser diode pad is formed on the light source assembly and connected with the laser diode.

Preferably, the insulation layer comprises a first insulation layer and a second insulation layer, and the heater is sandwiched between the first insulation layer and the second insulation layer.

Preferably, thickness of the second insulation layer is thicker than that of the first insulation layer, and thermal conductivity of the second insulation layer is lower than that of the first insulation layer.

Preferably, the first insulation layer is made of $SiO_2$, and the second insulation layer is made of SiN or AiN.

Preferably, the heater is made of tungsten or platinum.

Accordingly, a thermally-assisted magnetic head, comprising a slider body and the light source unit mentioned above attached on a surface of the slider body.

In comparison with the prior art, the light source unit includes a heater buried in the insulation layer and connected to the connection pad layer, so as to form a heater circuit. During the operation, the laser diode and the heater are controlled to work alternately. Specifically, after the laser diode works for a certain time, the laser diode is turned off and the heater is turned on; periodically, the laser diode works again. In such a way, the temperature of the laser diode can be compensated and maintained at a stable condition. As a result, the performance of the magnetic head is improved, and data tracking on the disk is facilitated. Further, since the heater is buried in the insulation layer, thus the size of the light source assembly and the substrate member is reduced.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1A:
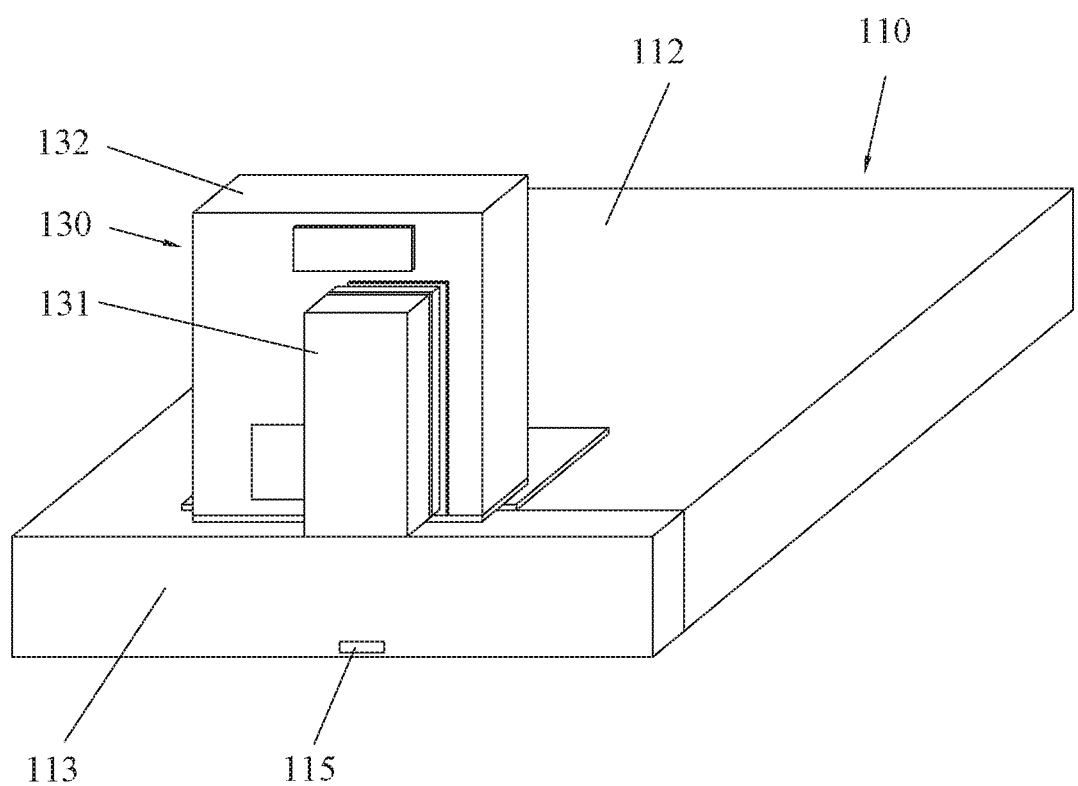
FIG. 1a is a partial exploded perspective view of a conventional thermally-assisted magnetic head.
Figure 1B:
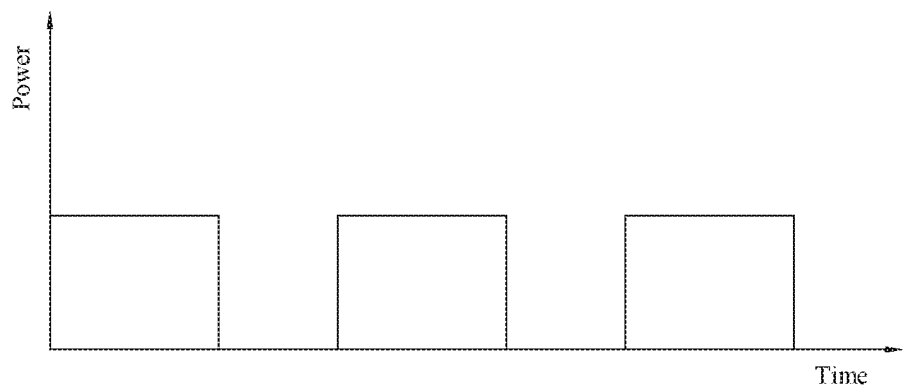
FIG. 1b shows the power of the laser diode of the conventional light source unit.

Various preferred embodiments of the invention will now be described with reference to the figures, wherein like reference numerals designate similar parts throughout the various views. As indicated above, the invention is directed to an improved light source unit with a positioning structure, which can maintain stable heat power for facilitating performance of the thermally-assisted magnetic head, further reduce the sizes of the light source unit and substrate member.

Figure 2:
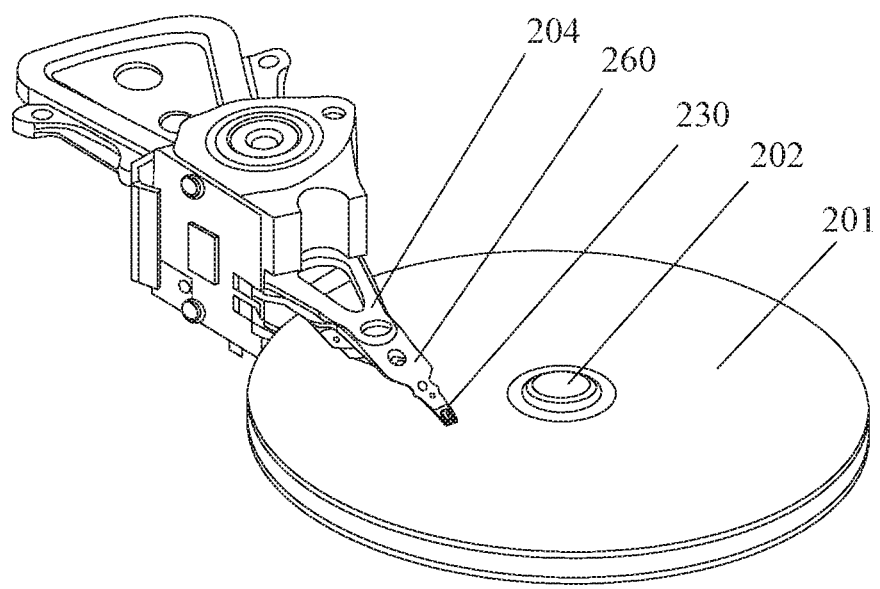
FIG. 2 is a perspective view of a hard disk drive with thermally-assisted magnetic heads according to one embodiment of the present invention.

FIG. 2 is a perspective view of the hard disk drive of the present invention. As shown, a hard disk drive 200 contains a number of rotatable magnetic disks 201 attached to a spindle motor 202, a set of drive arms 204 and HGAs 260 mounted on the ends of the drive arms 204. Typically, a VCM is provided for controlling the motion of the drive arm 204.

Figure 3:
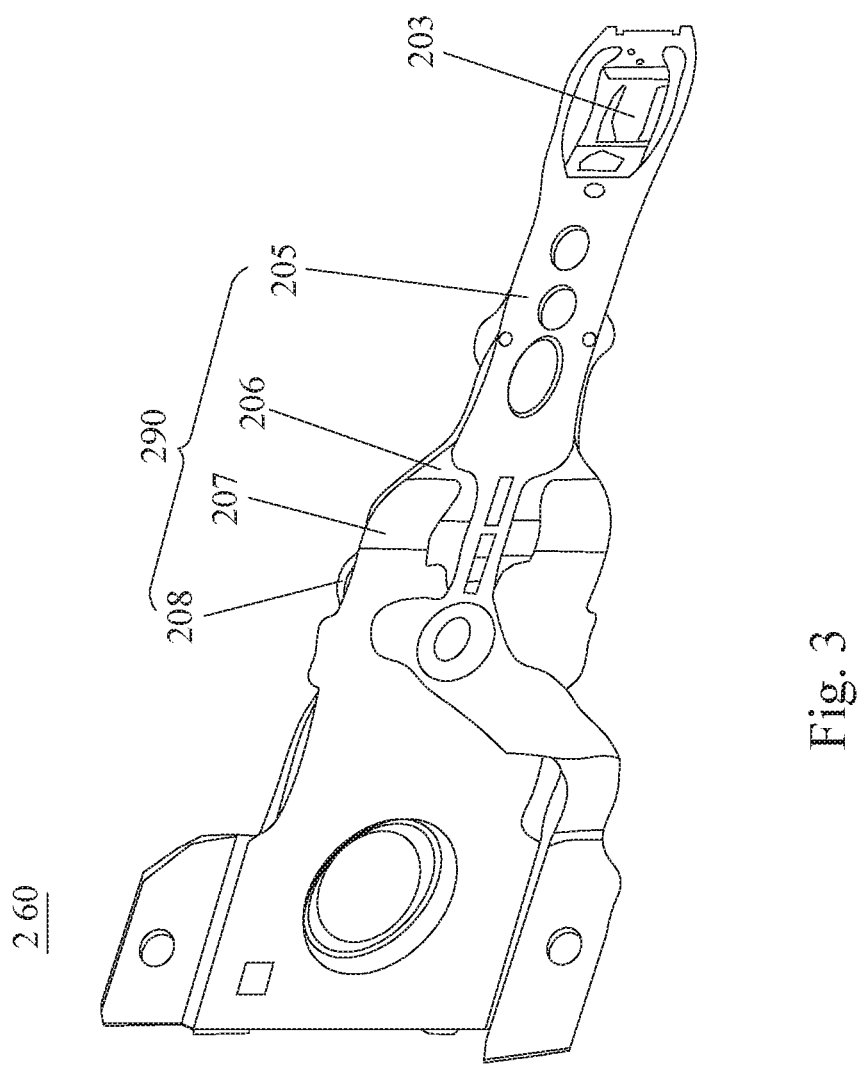
FIG. 3 is a perspective view of a head gimbal assembly with a thermally-assisted magnetic head according to one embodiment of the present invention.

Referring to FIG. 3, the HGA 260 contains a thermally-assisted magnetic head 230 and a suspension 290 for supporting the thermally-assisted magnetic head 230. The suspension 290 includes a load beam 206, a base plate 208, a hinge 207 and a flexure 205, all of which are assembled with each other. The hinge 207 has a mounting hole (not shown) formed thereon to assemble the hinge 207 to the base plate 208. As the main structure of the HGA 260 is known to the persons skilled in the art, thus is omitted here. Specifically, the thermally assisted head 230 is carried on the flexure 205.

Figure 4:
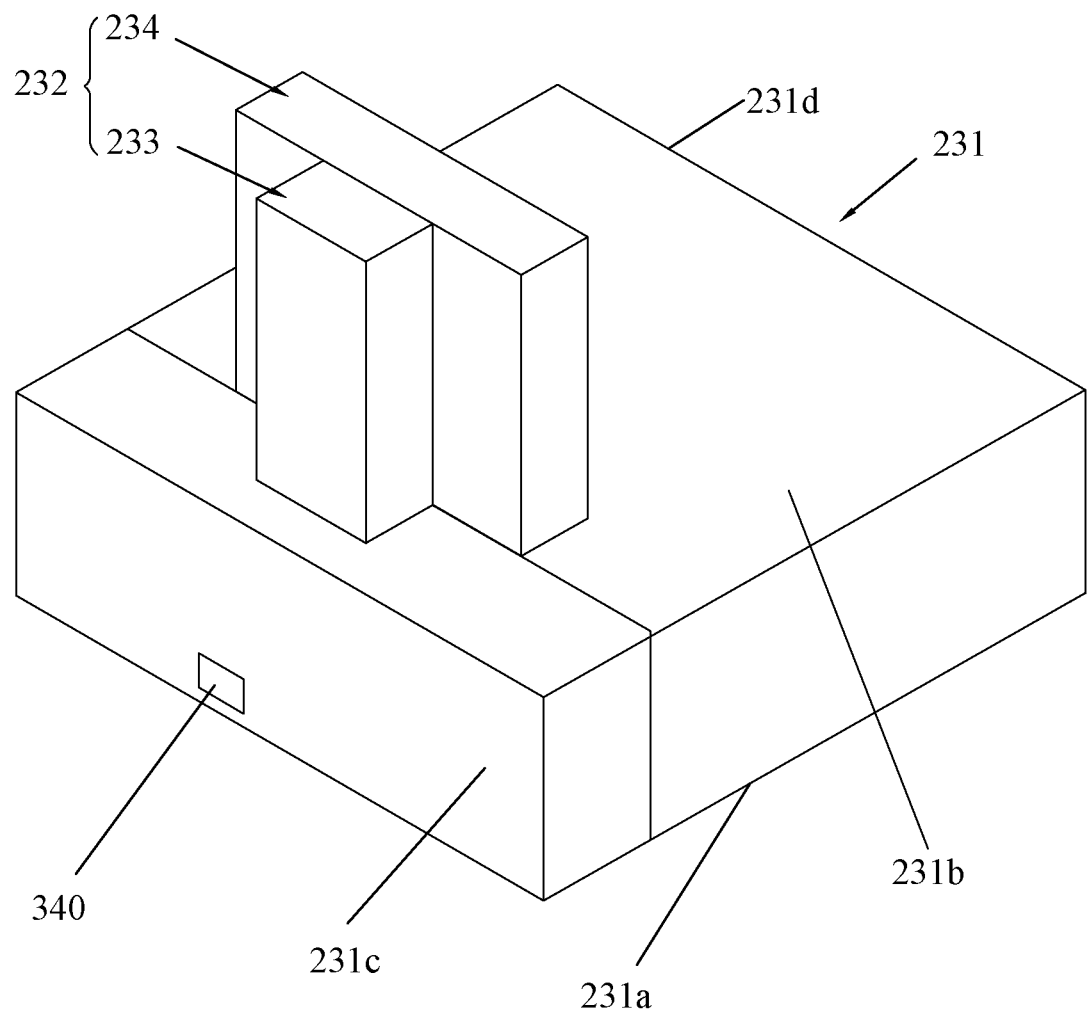
FIG. 4 is a perspective view of a thermally-assisted magnetic head according to one embodiment of the present invention.

Referring to FIG. 4, the thermally-assisted magnetic head 230 according to the present invention is illustrated. The thermally-assisted magnetic head 230 includes a slider body 231 and a light source unit 232 formed on the slider body 231 for thermally assisted magnetic recording. The light source unit 232 includes a light source 233 and a substrate member 234 for supporting the light source 233. In the present embodiment, the slider body 231, the light source 233, and the substrate member 234 are generally rectangular shaped.

As shown, the slider body 231 has an ABS 231a, a bottom surface 231b opposite to the ABS 231a, a trailing edge 231c, a leading edge 231d opposite to the trailing edge 231c, and two side surfaces (not labeled). The ABS 231a facing to the disk is processed so as to provide an appropriate flying height, and a thermally-assisted magnetic head section 340 is embedded in the trailing edge 231c. The trailing edge 231c has multiple bonding pads (not shown) to connect with a suspension 290 of the HGA 260. Specifically, the light source unit 232 is mounted on the bottom surface 231b, for emitting laser light to facilitate writing.

Figure 5A:
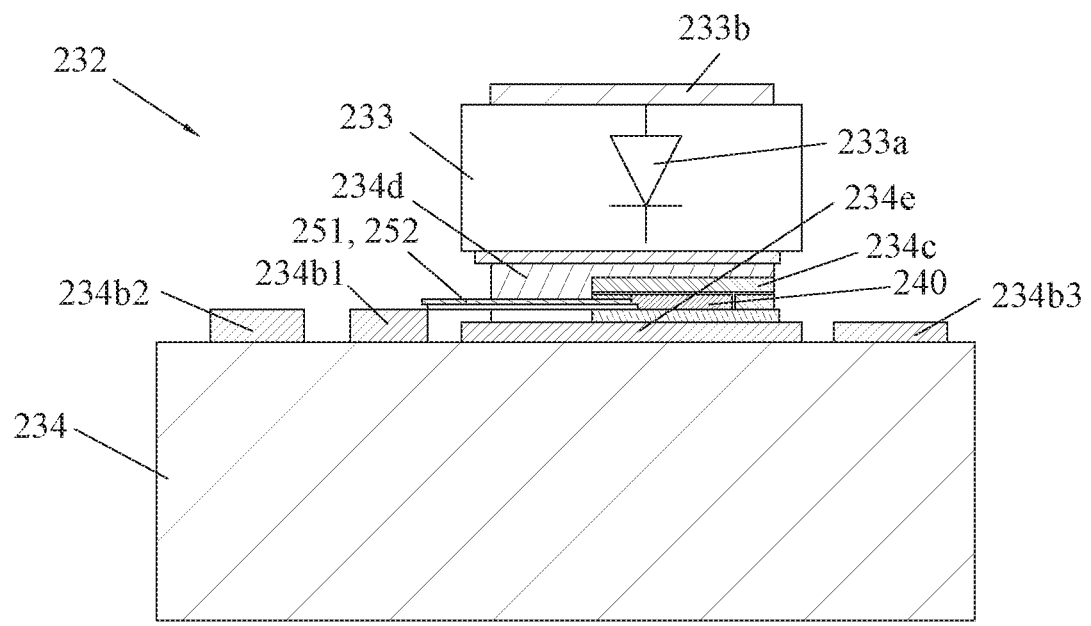
FIG. 5a is a cross section view of a light source unit according to a first embodiment of the present invention.

As shown in FIG. 5a, the light source unit 232 includes the substrate member 234 and the light source 233 attached on the substrate member 234 via a solder (not shown). Preferably, the light source 233 has a laser diode 233a embedded therein which is electrically and physically connected with substrate member 234.

Figure 9:
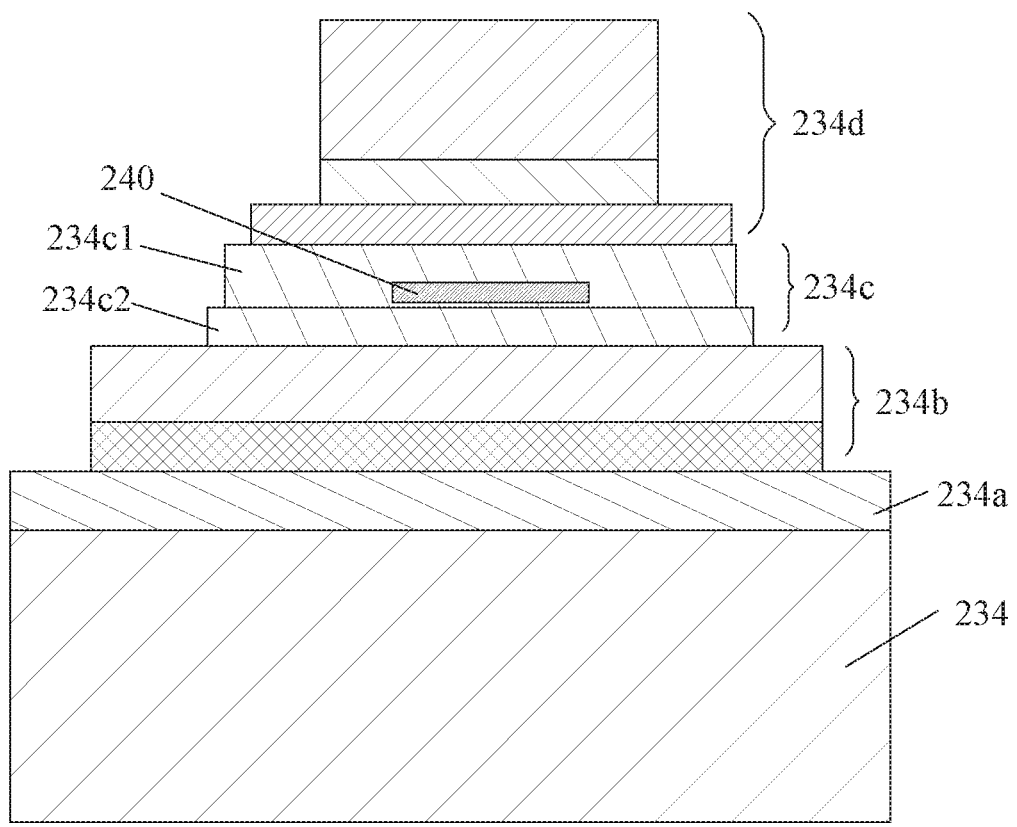
FIG. 9 shows a layer structure of the substrate member with the multiple layers formed thereon.

As illustrated in FIGS. 5a and 9, the substrate member 234 has a bonding surface on which a base layer 234a, a connection pad layer 234b, an insulation layer 234c and a bonding layer 234d are formed, from bottom to up. Combining with FIG. 9, the substrate member 234 is a wafer made of Si, the base layer 234a is a thermal oxidation layer made of $SiO_2$. The connection pad layer 234b is adapted for arranging pads and leads for electrical connection. A heater 240 is buried in the insulation layer 234c, and the heater 240 is made of Tungsten or Pt or high resistance material. Preferably, the insulation layer 234c includes a first insulation layer 234c1 and a second insulation layer 234c2, and the heater 240 is sandwiched between the first insulation layer 234c1 and the second insulation layer 234c2. More specifically, the heater 240 is deposited on the second insulation layer 234c2. The thickness of the second insulation layer 234c2 is thicker than the first insulation layer 234c1, and the thermal conductivity of the second insulation layer 234c2 is lower than that of the first insulation layer 234c1. The thickness of the second insulation layer 234c2 is likely more than 1.0 μm and the material is $SiO_2$ and so on. The first insulation layer 234c1 is less than 1.0 μm and the material is SiN, AiN and so on. In such a configuration, temperature rise at the upper area where is located above the first insulation layer 234c1 is significant, to bring more thermal flow at the upper area. The bonding layer 234d may include three layers made of AuSn, by means of solder bonding, the light source assembly 233 is bonded with the bonding layer 234d of the substrate member 234. The light source assembly 233 includes a laser diode 233a embedded therein and connected to the connection pad layer 234b on the bonding surface of the substrate member 234, a laser diode pad 233b is formed on the light source assembly 233 for electrical connection.

In this embodiment, a bonding area 234e is defined on the bonding surface of the substrate member 234, that is, the bonding area 234e is that area faces to the bonding position of the light source assembly 233. The heater 240 is buried below the light source assembly 233 and located within the bonding area 234e, that is, the heater 240 is covered under the light source assembly 233. Preferably, the heater 240 is made of tungsten.

Figure 5B:
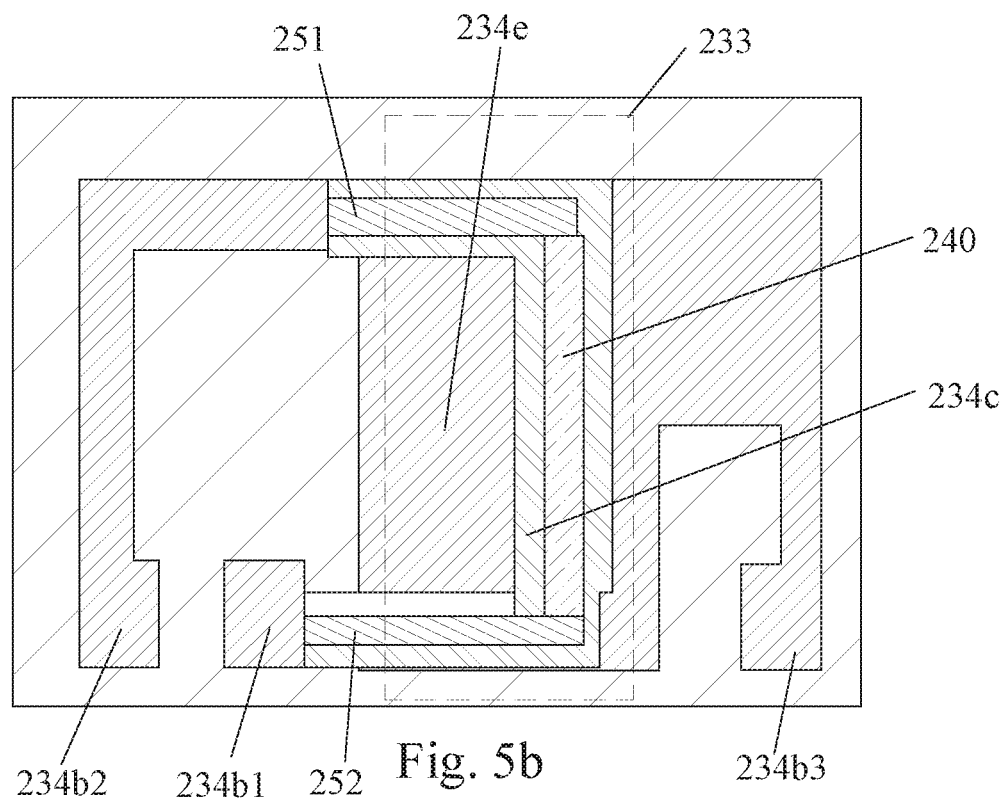
FIG. 5b is a simplified top view of the light source unit of FIG. 5a, showing the layout of the connection pads especially.

As shown in FIGS. 5a and 5b, the connection pad layer 234b is adapted for arranging pads and leads 251, 252 and includes a heater pad 234b1, a heater grounding pad 234b2 and the laser diode grounding pad 234b3. Specifically, the heater pad 234b1 and the heater grounding pad 234b2 are connected with the heater 240 by means of leads, thereby forming a heater circuit. The laser diode grounding pad 234b3 and the laser diode pad 233b on the light source assembly 233 is connected with the laser diode 233a, thereby forming a laser diode circuit. While electrical power is applied to the heater circuit and the laser diode circuit, the heater 240 and the laser diode 233a can be controlled. During the operation, the laser diode and the heater are controlled to work alternately, specifically, after the laser diode 233a works for a certain time, the laser diode 233a is turned off and the heater 240 is turned on; periodically, the laser diode 233a works again. In such a way, the temperature of the laser diode 233a can be compensated and maintained at a stable condition. As a result, the performance of the magnetic head is improved, and data tracking on the disk is facilitated. Further, since the heater 240 is buried and covered under the light source assembly 233, thus heat effect is better, and the size of the light source assembly 233 is reduced.

Figure 6A:
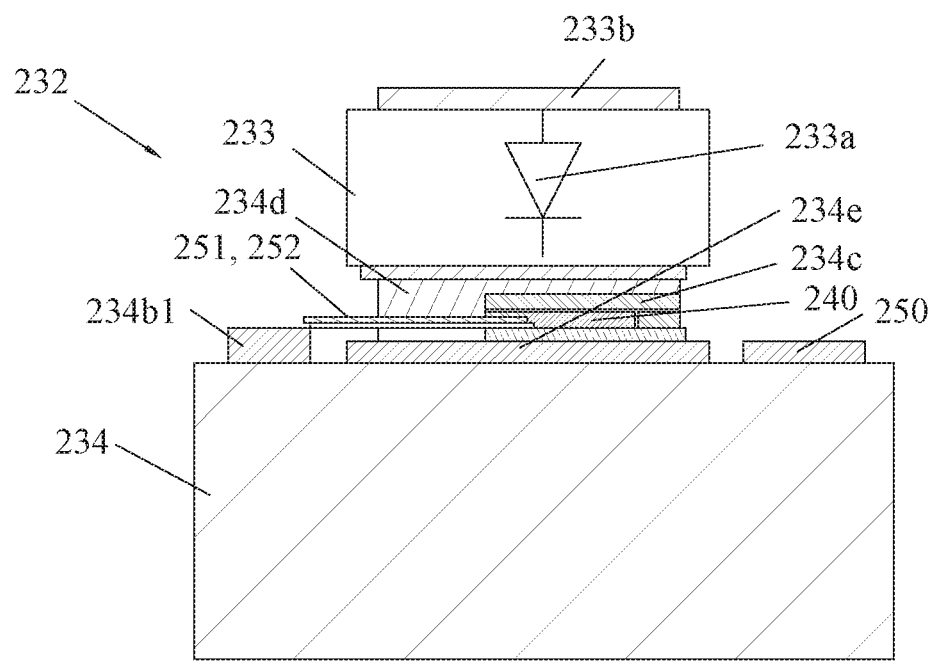
FIG. 6a is a cross section view of a light source unit according to a second embodiment of the present invention.
Figure 6B:
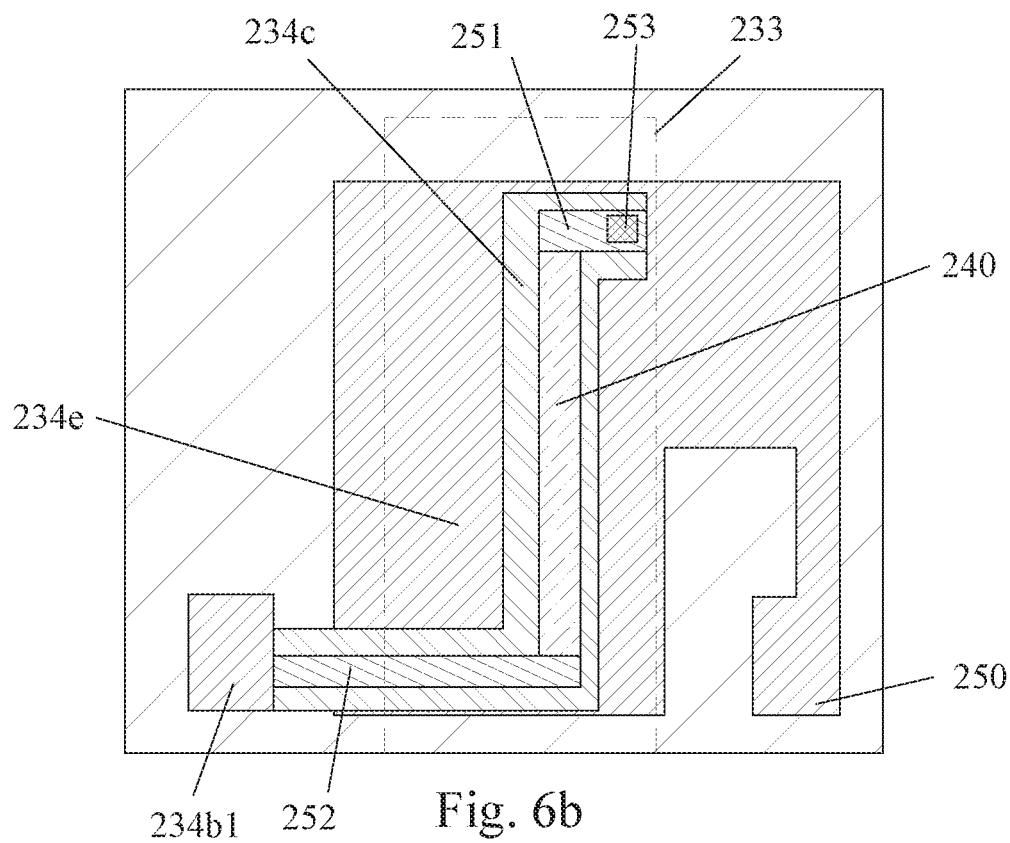
FIG. 6b is a simplified top view of the light source unit of FIG. 6a, showing the layout of the connection pads especially.

As shown in FIG. 6a-6b, a preferable embodiment is shown. In this embodiment, a common grounding pad 250 is arranged for connecting with the heater 240 and the laser diode 233a respectively, therefore further reducing the quantity of the connection pads on the surface of the substrate member 234. Specifically, the connection pad layer 234b formed on the bonding surface of the substrate member 234 includes the heater pad 234b1 and the common grounding pad 250, a via hole 253 is formed between the insulation layer and the common grounding pad 250, a first lead 251 is connected between the via hole 253 and the heater 240, a second lead 252 is connected between the heater 240 and the heater pad 234b1, in such a way, the heater circuit is formed. Similarly, the laser diode pad 233b is formed on the light source assembly 233. The laser diode 233a is connected to the laser diode pad 233b and the common grounding pad 250 by means of leads, thereby the laser diode circuit is formed. The detailed structures of other components of the light source unit 232 in this embodiment are the same with the first embodiment, which are omitted here.

During the operation, the laser diode 233a and the heater 240 are controlled to work alternately, specifically, after the laser diode 233a works for a certain time, the laser diode 233a is turned off and the heater 240 is turned on; periodically, the laser diode 233a works again. In such a way, the temperature of the laser diode 233a can be compensated and maintained at a stable condition. As a result, the performance of the magnetic head is improved, and data tracking on the disk is facilitated. Further, since the heater 240 is buried and covered under the light source assembly 233, thus heat effect is better, and the size of the light source assembly 233 is reduced. Especially, since the common grounding pad 250 is formed to be served as a grounding pad for both of the heater circuit and the laser diode circuit, thus the quantity of the connection pads on the surface of the substrate member 234 is decreased, that is to say, the width of the substrate member 234 is reduced.

Figure 7A:
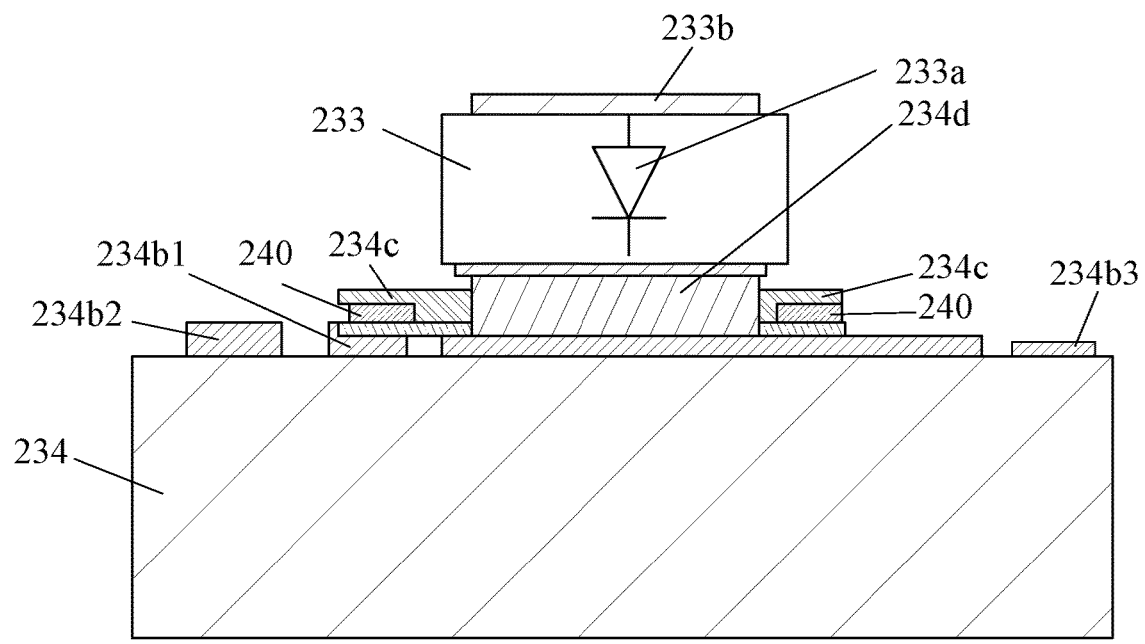
FIG. 7a is a cross section view of a light source unit according to a third embodiment of the present invention.
Figure 7B:
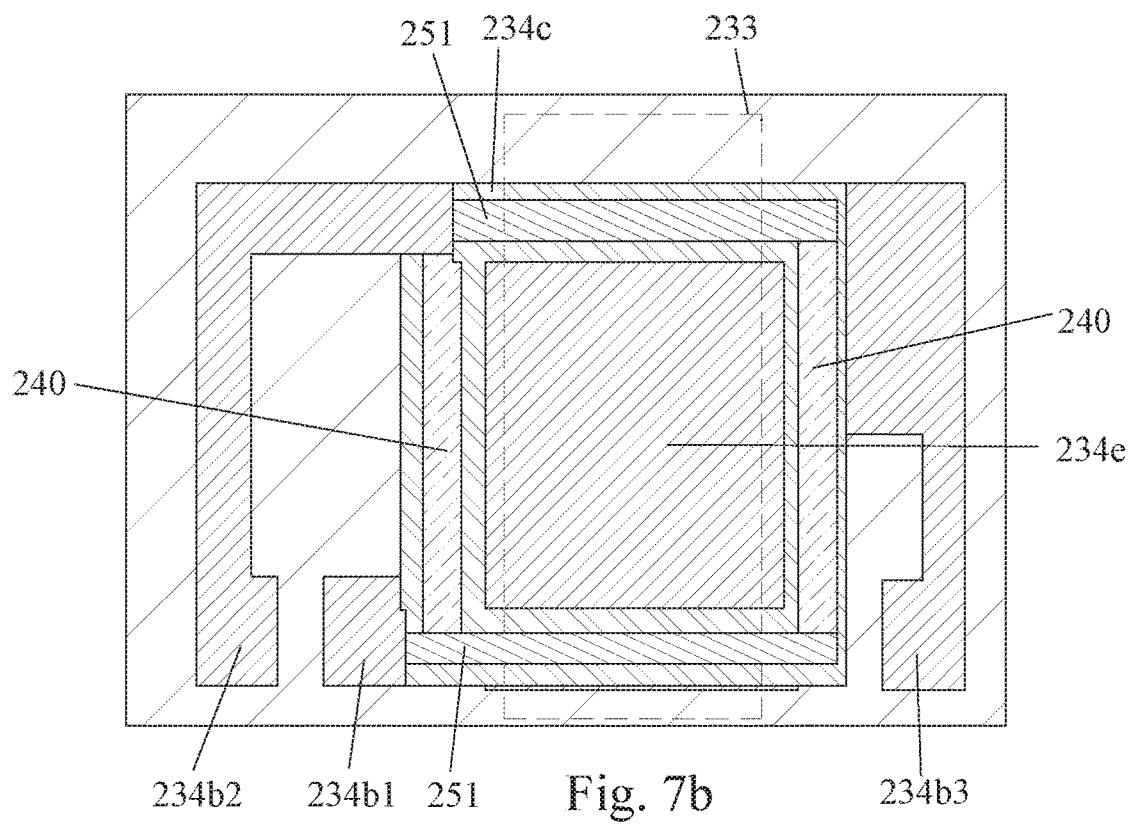
FIG. 7b is a simplified top view of the light source unit of FIG. 7a, showing the layout of the connection pads especially.

FIGS. 7a-7b shows a third embodiment of the light source unit. Different from the first embodiment, the heater 240 in this embodiment is located beside the light source assembly 233, rather than below the light source assembly 233. Specifically, a bonding area 234e is defined on the bonding surface of the substrate member 234. The light source assembly 233 is bonded with the bonding area 234a via the bonding layer 234d and the solder ball. While the heater 240 is buried in the insulation layer 234c, and located beyond the bonding area 234e. That is, the heater 240 is not covered by the light source assembly 233. In addition, the connection pad layer 234b includes the heater pad 234b1, the heater grounding pad 234b2, and the laser diode grounding pad 234b3 which are formed on the base layer of the substrate member 234 and located beyond the bonding area 234e.

In this embodiment, two heaters 240 are formed beside the light source assembly 233, and the two heaters 240 are connected in series, together with one heater pad 234b1 and one heater grounding pad 234b2, the heater circuit is formed. Similarly, the laser diode circuit is formed by connecting the laser diode 233a with the laser diode pad 233b and the laser diode grounding pad 234b3 respectively. During the operation, the laser diode 233a and the heaters 240 are controlled to work alternately, specifically, after the laser diode 233a works for a certain time, the laser diode 233a is turned off and the heaters 240 are turned on; periodically, the laser diode 233a works again. In such a way, the temperature of the laser diode 233a can be compensated and maintained at a stable condition. Furthermore, read write performance of jitter on track direction, crosstalk, adjacent track erasure is improved, as a result, the performance of the magnetic head is improved, and data tracking on the disk is facilitated.

Figure 8:
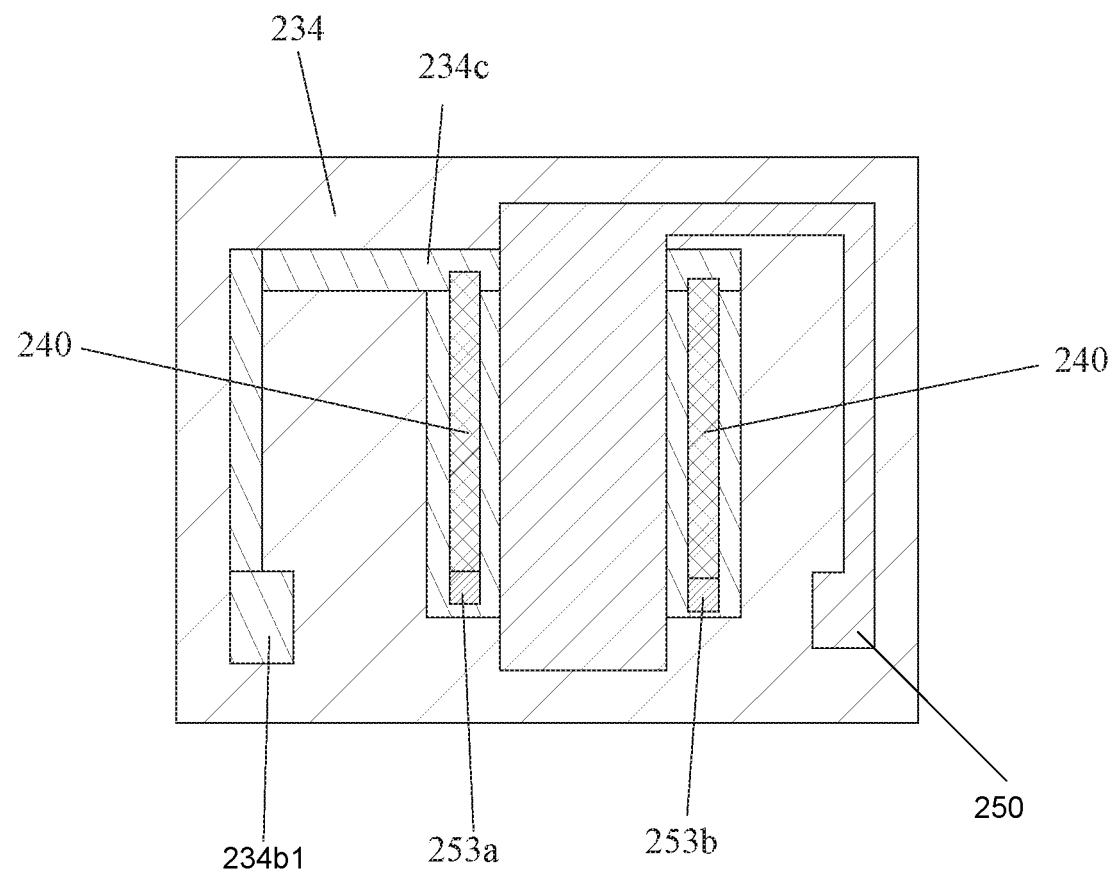
FIG. 8 is a simplified top view of a light source unit according to a fourth embodiment of the present invention.

FIG. 8 shows a preferable embodiment based on that in FIGS. 7a and 7b. Different from the third embodiment, a common grounding pad 250 is arranged for connecting with the heater 240 and the laser diode 233a respectively, therefore further reducing the quantity of the connection pads on the surface of the substrate member 234. Specifically, the connection pad layer 234b formed on the bonding surface of the substrate member 234 includes the heater pad 234b1 and the common grounding pad 250, two via holes 253a and 253b are formed between the insulation layer 234c and the common grounding pad 250. The detailed structures of other components of the light source unit 232 in this embodiment are the same with the first embodiment, which are omitted here.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A light source unit for thermally-assisted magnetic head, comprising:
   a substrate member having a bonding surface,
   multiple layers formed on the bonding surface and comprising a base layer, a connection pad layer, an insulation layer and a bonding layer;
   a light source assembly attached on the bonding layer of the substrate member and having a laser diode embedded therein and connected to the connection pad layer on the bonding surface, so as to form a laser diode circuit; and
   a heater buried in the insulation layer and connected to the connection pad layer, so as to form a heater circuit,
   wherein the bonding surface of the substrate member has a bonding area that is bonded to the light source assembly, the heater is buried below the light source assembly and located within the bonding area, and the connection pad layer comprises a heater pad connected with the heater and a common grounding pad connected with the heater and the laser diode respectively.

2. The light source unit according to claim 1, wherein a via hole is formed between the insulation layer and the common grounding pad, a first lead is connected between the via hole and the heater, a second lead is connected between the heater and the heater pad, so as to form the heater circuit.

3. The light source unit according to claim 1, wherein a laser diode pad is formed on the light source assembly, and the laser diode is connected with the laser diode pad and the common grounding pad, so as to form the laser diode circuit.

4. The light source unit according to claim 1, wherein the heater pad is formed on the base layer of the substrate member and located beyond the bonding area.

5. The light source unit according to claim 1, wherein the insulation layer comprises a first insulation layer and a second insulation layer, and the heater is sandwiched between the first insulation layer and the second insulation layer.

6. The light source unit according to claim 5, wherein thickness of the second insulation layer is thicker than that of the first insulation layer, and thermal conductivity of the second insulation layer is lower than that of the first insulation layer.

7. The light source unit according to claim 5, wherein the first insulation layer is made of $SiO_2$, and the second insulation layer is made of SiN or AiN.

8. The light source unit according to claim 1, wherein the heater is made of tungsten or platinum.

9. A thermally-assisted magnetic head, comprising a slider body and a light source unit attached on a surface of the slider body, the light source unit comprising:
   a substrate member having a bonding surface,
   multiple layers formed on the bonding surface and comprising a base layer, a connection pad layer, an insulation layer and a bonding layer;
   a light source assembly attached on the bonding layer of the substrate member and having a laser diode embedded therein and connected to the connection pad layer on the bonding surface, so as to form a laser diode circuit; and
   a heater buried in the insulation layer and connected to the connection pad layer, so as to form a heater circuit,
   wherein the bonding surface of the substrate member has a bonding area that is bonded to the light source assembly, the heater is buried below the light source assembly and located within the bonding area, and the connection pad layer comprises a heater pad connected with the heater and a common grounding pad connected with the heater and the laser diode respectively.

* * * * *